United States Patent [19]

Hardy et al.

[11] 3,765,712

[45] Oct. 16, 1973

[54] TRANSFER MECHANISM GRIPPING DEVICE

[75] Inventors: Donald F. Hardy, Horseheads; Thomas W. Palmer, III, Elmira, both of N.Y.

[73] Assignee: Dart Industries Inc., Los Angeles, Calif.

[22] Filed: Mar. 7, 1972

[21] Appl. No.: 232,413

[52] U.S. Cl. ............... 294/87 R, 294/87.26, 294/88
[51] Int. Cl. ............................................... B66c 1/42
[58] Field of Search ...................... 294/87 R, 87.22, 294/87.24, 87.26, 88; 214/1 B, 1 BB

[56] References Cited
UNITED STATES PATENTS

| | | | |
|---|---|---|---|
| 3,024,058 | 3/1962 | Sinclair | 294/87 R |
| 3,174,791 | 3/1965 | Dardaine | 294/87.24 |
| 3,411,636 | 11/1968 | Wallis | 294/87.26 X |
| 3,298,541 | 1/1967 | Alexon | 214/1 BB |
| 2,817,528 | 12/1957 | Sanford | 294/87.24 X |
| 3,112,136 | 11/1963 | Hammond | 294/88 X |

Primary Examiner—Evon C. Blunk
Assistant Examiner—Johnny D. Cherry
Attorney—Leigh B. Taylor et al.

[57] ABSTRACT

An article and more particularly a glassware gripping device constructed with opposed mating resiliently mounted gripper elements movably mounted with respect to each other and affording an inherent gripping force such that actuator applied forces may be substantially reduced. Additionally, the gripper elements per se of the device are of a modified configuration, i.e., feathered forwardly and rearwardly on their underside to enable their placement in close proximity with the concavity produced in a fluidized bed surface by article immersion.

6 Claims, 9 Drawing Figures

Patented Oct. 16, 1973

TRANSFER MECHANISM GRIPPING DEVICE

This invention concerns apparatus for the manufacture of containers and more particularly concerns gripping apparatus for the manufacture of glass containers having improved strength and a protective plastic sheath or coating.

Prior art processes and methods for the manufacture of glass containers have, for example, employed metallic oxide coatings, polyethylene film coatings and the like. These, however, have not been adequate in that such containers continue to be readily subject to breakage if dropped. Further, if the containers spoken of are internally pressured, as is the situation in many instances, a glass failure due to breakage may propel glass fragments with violent force for substantial distances. The prior art coatings, therefore, have functioned only to protect the glass container surface from abrasion or the like and thereby maintain maximum glass resistance to failures of all types and descriptions. Such do not change the fragmentation characteristics of ware that may be broken while under internal pressurization.

It, therefore, has been a prime objective of the industry to develop coatings, coating technology and other improvements in glass compositions themselves to minimize these conditions of fragmentation.

Similarly, it should be recognized that various prior art plastic sheaths have been employed on glass aerosol containers. These have, however, not been commercially or practically adaptable for typical glass containers in that the resulting characteristic physical properties of the combination were unsatisfactory. Coincidentally, in this respect, continuous apparatus for coating for large quantities of individual articles have normally required numerous individual clamps attached to a usually long endless chain conveyor. These, of course, increased the risk of or incidence of failure, but further, even in systems such as are disclosed in our copending application, Ser. No. 232,455 filed on 3-7-72, the gripping devices, per se, present continuing production problems. For example, operating piston/cylinder pressure needed in the noted application disclosure were on the order of 30-65 psi. This resulted in unduly rough handling of the ware and theoretically could be harmful to or reduce the strength thereof. Likewise, since fluidized bed dipping is contemplated in the system, it is desirable to immerse the ware to the fullest possible extent to assure maximum coating coverage to the finish. The configuration and construction of the gripping device therefore is accordingly of significant importance to accomplish this end.

A further objective of the instant invention therefore is to improve the clamping characteristics of a fluid powered gripping device, as well as modifying other constructional characteristics to enable maximum immersion of the articles held thereby into a fluidized bed coater.

In summary, an improved gripping device is disclosed herein which device includes a gripping element configuration and operates in a manner similar to that shown in our noted co-pending application. Here, however, the respective mating elements depend from resilient members, both of which in their closing motion about the bottle finish, will flex to provide a cushioned effect yet firmly retain the bottle in a steady upright position. Further, in conjunction therewith, the underside of the gripper elements have been feathered or tapered to more satisfactorily conform to the shape of the coating bed configuration surrounding a dipped article. This, as can be appreciated, enables one to lower the article even further into the bed of coating material.

Additional objectives and advantages will, however, become more apparent from the specification, claims and drawings wherein:

Figure 3:
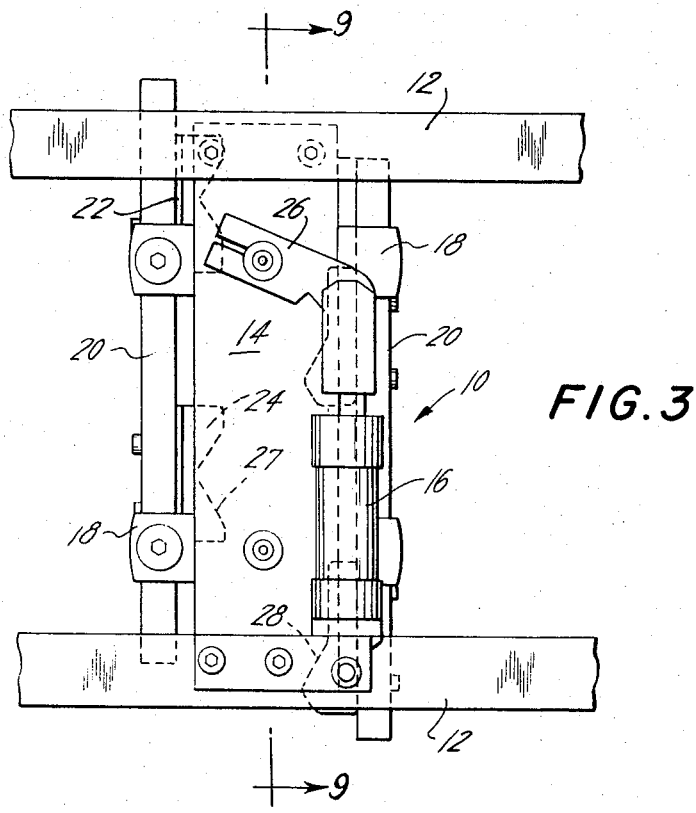
FIG. 3 is a top plan view of the gripping device shown in FIG. 1.
Figure 5:
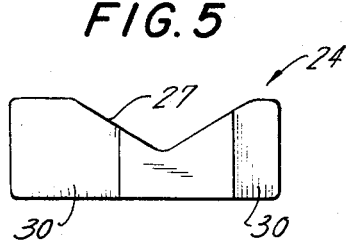
FIG. 5 and 7 are bottom plan views of mating gripper elements.
Figure 7:
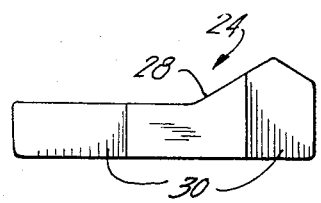
Figure 6:
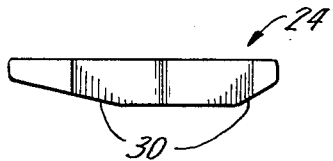
Figure 8:
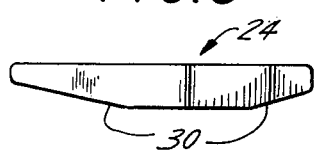
Figure 9:
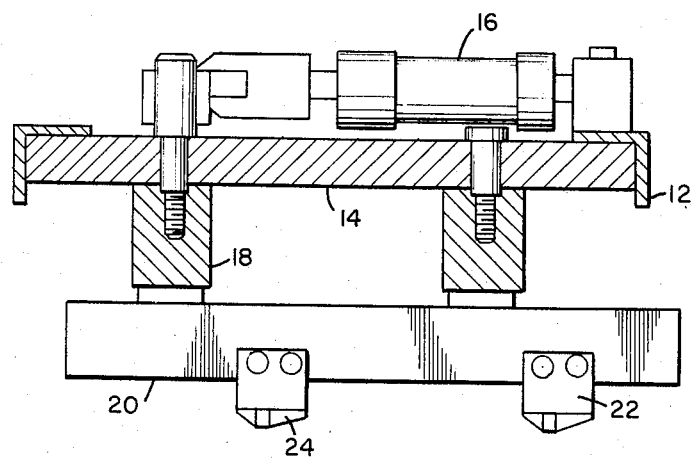

FIG. 6 and 8 are side elevational views of the respective gripper elements shown in FIGS. 5 and 7 illustrating the opposed gripping surfaces of each; and FIG. 9 is a partial cross-sectional view of the gripper mechanism taken along line 9—9 of FIG. 3.

As has been indicated hereinabove, the gripping devices of this invention are particularly well suited for use in conjunction with fluidized bed coating apparatus. Therefore, as the discussion progresses, reference may be made to apparatus of this type. It should, however, be appreciated that such may be employed in other differing environments with equal effectiveness.

Figure 1:
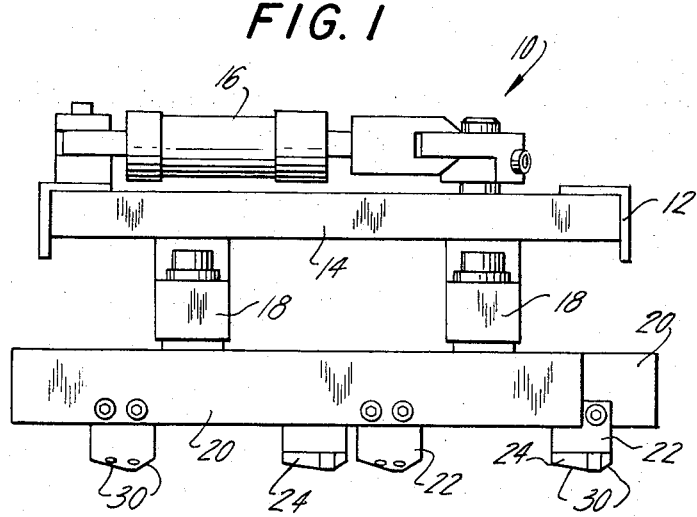
FIG. 1 is a side elevational view of the gripping device illustrating both the fluid actuator therefor and the gripper elements and their resilient mountings.

The instant gripping devices 10 therefore are normally mounted on a transfer mechanism (not shown) which includes a bridge 12 and support member 14 which are movable with such over a fluidized bed (not shown). As indicated, articles and particularly glassware, must be firmly yet gently gripped in a repetitively predictable and reliable manner to assure proper coating coverage and uninterrupted machine operation and process continuity. This device and usually a multiplicity thereof are mounted on support member 14 of the transfer mechanism as is apparent from FIG. 1. This member carries the various mounts that accommodate fluid cylinder 16 and connectors 18. The connectors likewise pivotally support a dual parallel bar arrangement 20 that, in turn, supports resilient members 22 and gripper elements 24 which actually contact and seize the ware.

Upon activation of cylinder 16, lever arm 26 (FIG. 3) which is rigidly affixed to one of the connectors 18, pivots turning with it that connector. This, depending upon the direction of oscillation, moves the bars 20 and grippers 24 either closer together or farther apart, responsive to the rotation of the connectors 18. In operation, the gripper elements will normally be in their open position until the bottle ware or the like becomes properly positioned for seizure. Then fluid cylinder 16 will be activated so as to close elements 24 and such will remain closed about the ware until it is time to re-deposit same after coating has been completed.

Figure 2:
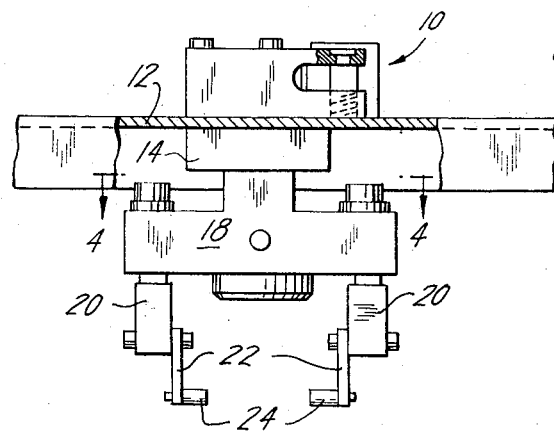
FIG. 2 is an end view of the gripping device shown in FIG. 1, partially broken away for the purpose of clarity.
Figure 4:
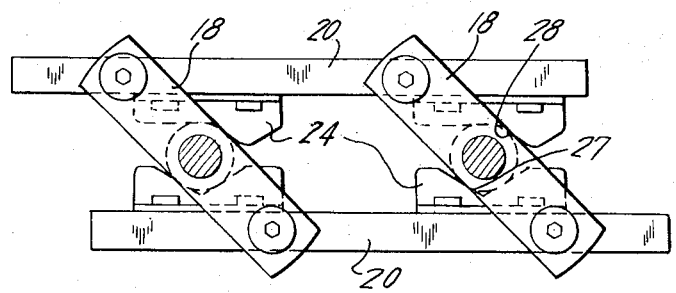
FIG. 4 is a cross-sectional view taken along line 4—4 of FIG. 2.

Resilient members 22 are of particular importance to this invention as is stressed above. These, as can be seen from FIGS. 1 and 2, depend from the parallel bar arrangement 20 and are formed from thin sheet-like material preferably spring steel. The type of material, its thickness and overall depending length are, of course, variable and such should be selected based upon the article or product characteristics and the resiliency accordingly required.

The use of members 22 are enabling in the reduction of fluid pressures in cylinder 16 since the inherent flexibility of these members can be relied upon in maintaining a uniform and sufficient gripping force upon articles seized thereby. In the system shown in our copending application, above referenced, relatively rigid grippers are employed and the fluid pressure in cylinder 16 therefore produces virtually all of the gripping force applied to the articles. Thus, increased pressures are necessitated and a significant shock loading may result therefrom. It is, of course, important in some instances, such as this where glassware is being handled to minimize this type loading so that damage because of same may likewise be minimized. Typically, by use of resilient member 22 pressure may be reduced by about 80 percent without affecting article or bottle stability and/or the gripping effect thereon.

Gripper elements 24 are also uniquely shaped as is characterized by V-notches 27 and modified V-notches 28 that will accommodate typical bottle finishes. These notches do, however, also render an additional important service by longitudinally aligning the ware prior to its being gripped should such be misaligned. Thus, bottle misalignment is compensated for without the need of additional apparatus and with minimum bottle breakage.

Attendant therewith, this invention further contemplates the underside modification of gripper elements 24 which are forwardly and rearwardly feathered as at 30, respectively. Thus, the forward and rear extremities of the element undersides tend to further conform to the shape of the fluidized bed cavity when articles such as bottles are dipped into same. This advantage is also accentuated by the downward dependency of elements 24 parallel bar arrangement 20 which thereby removes such bars from the vicinity of the top of the mentioned bed material.

The features above described, accordingly have markedly improved the operational characteristics of an article transfer and gripping system.

We claim:

1. An article gripping device suitable for use in transferring glassware or the like and comprising:

a pair of substantially parallel and laterally opposed movable bars having immovably affixed thereto a plurality of depending means that are spatially positioned along each of the bars for planar movement therewith;

a connector assembly pivotally mounted to a frame support and interengaged with said bars such that the bars reciprocate laterally and longitudinally toward and away from one another responsive to the oscillatory movement of said connector assembly;

said means including opposed gripper elements positioned and simultaneously movable with said bars in approximately the same plane both longitudinally and laterally toward and away from one another so that in at least one position of said bars the means and elements affixed to one are in juxtaposition and in gripping relationship with the means and elements affixed to the other; and actuator means engaged with said connector assembly to intermittently oscillate said assembly.

2. An article gripping device according to claim 1 wherein said depending means further includes relatively thin resilient members that immovably link together said gripper elements and said bars and at least one of the juxtaposed gripper elements has an article contacting surface having a substantially V-shaped configuration.

3. An article gripping device according to claim 2 wherein the other of the juxtaposed gripper elements incorporates an article contacting surface having a protruding abutment means adapted for alignment with a portion of said V-shaped configuration in at least one position of said parallel bar arrangement so as to firmly grip the article therebetween.

4. An article gripping device according to claim 2 wherein said gripper elements are mounted to the resilient members at one extremity thereof.

5. An article gripping device according to claim 2 wherein said gripper elements project in a substantially 90° orientation from said resilient members.

6. An article gripping device according to claim 5 wherein the undersides of said gripper elements are feathered both toward the forward and rear extremities thereof.

* * * * *